United States Patent
Dahan

(10) Patent No.: US 9,841,960 B2
(45) Date of Patent: Dec. 12, 2017

(54) DYNAMIC PROVISION OF DEBUGGABLE PROGRAM CODE

(71) Applicant: CA, Inc., Islandia, NY (US)

(72) Inventor: Jean David Dahan, Cedar Park, TX (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/673,671

(22) Filed: Mar. 30, 2015

(65) Prior Publication Data

US 2016/0291951 A1    Oct. 6, 2016

(51) Int. Cl.
G06F 9/45    (2006.01)
G06F 9/44    (2006.01)
G06F 11/36   (2006.01)
G06F 9/445   (2006.01)

(52) U.S. Cl.
CPC .............. *G06F 8/47* (2013.01); *G06F 8/53* (2013.01); *G06F 8/70* (2013.01); *G06F 9/44521* (2013.01); *G06F 11/3624* (2013.01)

(58) Field of Classification Search
CPC .......... G06F 8/47; G06F 8/70; G06F 11/3624; G06F 8/53; G06F 9/44521
USPC ........................................................ 717/145
See application file for complete search history.

(56) References Cited

U.S. PATENT DOCUMENTS

| | | | |
|---|---|---|---|
| 6,389,383 B1 * | 5/2002 | Sarathy | G06F 11/3664 703/21 |
| 6,981,249 B1 * | 12/2005 | Knoblock | G06F 8/73 717/141 |
| 8,856,752 B2 * | 10/2014 | Rosen | G06F 8/71 717/127 |
| 8,966,454 B1 | 2/2015 | Michelsen et al. | |
| 8,984,490 B1 | 3/2015 | Dahan | |
| 9,235,490 B2 | 1/2016 | Dahan | |
| 2002/0023175 A1 * | 2/2002 | Karlak | G06F 9/4843 719/314 |
| 2002/0073398 A1 * | 6/2002 | Tinker | G06F 8/65 717/110 |
| 2003/0023956 A1 * | 1/2003 | Dulberg | G06F 11/3624 717/130 |
| 2003/0065935 A1 * | 4/2003 | Neufeld | G06F 11/1433 713/190 |
| 2008/0209401 A1 * | 8/2008 | Fanning | G06F 11/3628 717/124 |
| 2009/0150420 A1 * | 6/2009 | Towner | G06F 11/3604 |

(Continued)

OTHER PUBLICATIONS

U.S. Appl. No. 14/093,293, filed Nov. 29, 2013 entitled Database Virtualization, Inventor(s) Jean-David Dahan et al.

(Continued)

*Primary Examiner* — Li B Zhen
*Assistant Examiner* — Sen Chen
(74) *Attorney, Agent, or Firm* — Patent Capital Group

(57) ABSTRACT

According to one aspect of the present disclosure, a method comprises receiving a command to load first compiled program code for execution by a processor. The first compiled program code is decompiled to generate source code. The source code is compiled to generate second compiled program code, the second compiled program code comprising information associated with the source code. The second compiled program code is provided to a debugger.

22 Claims, 4 Drawing Sheets

(56) References Cited

U.S. PATENT DOCUMENTS

| | | | |
|---|---|---|---|
| 2011/0154300 A1* | 6/2011 | Rao | G06F 11/3624 717/133 |
| 2011/0258532 A1* | 10/2011 | Ceze | G06F 17/30902 715/234 |
| 2013/0298185 A1* | 11/2013 | Koneru | G06F 15/173 726/1 |
| 2015/0195376 A1* | 7/2015 | Sehr | H04L 67/42 709/203 |
| 2015/0199249 A1 | 7/2015 | Dahan | |
| 2015/0199256 A1 | 7/2015 | Michelsen et al. | |
| 2015/0199515 A1* | 7/2015 | Qureshi | G06F 21/56 726/22 |
| 2015/0286470 A1 | 10/2015 | Dahan | |

OTHER PUBLICATIONS

U.S. Appl. No. 14/093,366, filed Nov. 29, 2013 entitled Database Virtualization, Inventor(s) Jean-David Dahan et al.

U.S. Appl. No. 14/990,173, filed Jan. 7, 2016 entitled, Transactional Boundaries for Software System Profiling, Inventor(s) Jean David Dahan et al.

U.S. Appl. No. 14/990,630, filed Jan. 7, 2016, entitled Transactional Boundaries for Software System Debugging, inventor(s), Jean David Dahan et al.

U.S. Appl. No. 15/085,971, filed Mar. 30, 2016, entitled Transactional Boundaries for Virtualization Within a Software System, inventor Jean David Dahan.

* cited by examiner

DYNAMIC PROVISION OF DEBUGGABLE PROGRAM CODE

BACKGROUND

The present disclosure relates in general to the field of software testing, and more specifically, to dynamic provision of debuggable program code.

A program run on a computing device may include several modules of program code that interact with each other to perform the functions of the program. A module of code may be any group of coding statements at any suitable layer of abstraction. Code that is executed by the computing device is generally derived from source code represented in a human readable format in order to simplify code generation and debugging.

BRIEF SUMMARY

According to one aspect of the present disclosure, a method comprises receiving a command to load first compiled program code for execution by a processor. The first compiled program code is decompiled to generate source code. The source code is compiled to generate second compiled program code, the second compiled program code comprising information associated with the source code. The second compiled program code is provided to a debugger.

BRIEF DESCRIPTION OF THE DRAWINGS

Like reference numbers and designations in the various drawings indicate like elements.

DETAILED DESCRIPTION

Figure 1:
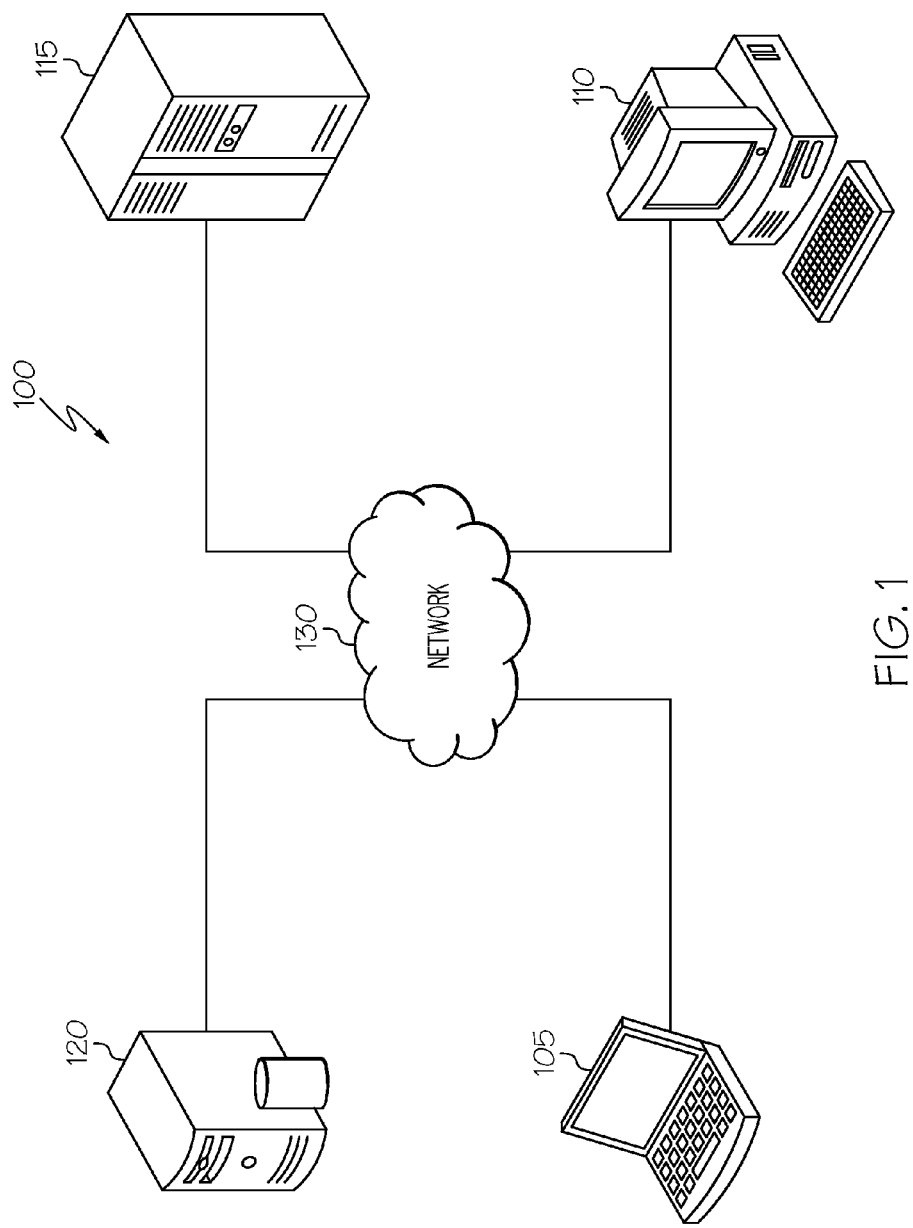
FIG. 1 illustrates a block diagram for an example system comprising multiple computing systems in accordance with certain embodiments.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, system 100 comprises computing device 105, computing device 110, application server 115, and database system 120 coupled together via network 130. In general, "servers," "clients," "computing devices," "network elements," "hosts," "system-type system entities," "user devices," and "systems", etc. (e.g., 105, 110, 115, 120, 130, etc.) in example computing environment 100, can include electronic computing devices operable to receive, transmit, process, store, or manage data and information associated with the computing environment 100. As used in this document, the term "computer," "computing system," "computing device," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 130, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, servers or systems (e.g., 115, 120, etc.) or other sub-system or component of computing environment 100 can be at least partially (or wholly) cloud-implemented, web-based, or distributed to remotely host, serve, or otherwise manage data, software services and applications interfacing, coordinating with, dependent on, or used by other services and devices in environment 100 (e.g., 105, 110, etc.). In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

A program run on a computing device may include several modules of program code that interact with each other to perform the functions of the program. As used herein, a module of code may be any group of coding statements at any suitable layer of abstraction. In particular embodiments, each module is a group of code in an intermediate language (e.g., Java, Scala, any .NET managed language, etc.) that is translated into machine code at runtime by an entity such as a virtual machine. As just one example, a module of code may be a .class file comprising bytecodes that are interpreted by a Java Virtual Machine (JVM) to form executable code. Code that is executed by the computing device is generally derived from source code represented in a human readable format in order to simplify code generation and debugging. For example, in Java, a .class file may be derived from source code comprising a .java file. When source code is compiled in order to generate lower level code, information that is valuable for debugging purposes (e.g., line numbers and/or local variable names from the source code, etc.) may be lost. This may make debugging problematic. For example, if the underlying source code for particular executable code is unavailable, a debugging program will not be able to identify line numbers or local variables of the source code in order to allow a user to trace the program flow through the source code to identify the sources of exceptions thrown or other unexpected results during execution of the code.

In various embodiments of the present disclosure, when a request to load a module of code for execution is received, if the desired debugging information has been stripped out during compilation, the module may be decompiled by a decompiler. A decompiler may translate the module into new source code. The new source code is not likely to be identical to the original source code, but should be functionally equivalent. The new source code may then be compiled in a manner that preserves at least some of the types of information lost during the original compilation (e.g., line numbers and/or local variables of the new source code). Accordingly, a debugger may now provide debugging features utilizing the information preserved during compilation including features that were not available with respect to the original compiled code.

In one example, implementations of a system can be provided that address at least some of the issues and provide at least some of the features described above. Turning to the example of FIG. 2, example components of the devices of FIG. 1 are depicted. In the embodiment depicted, system 200 includes computing devices 105 and 110, application server 115, and database system 120 coupled via network 130. Each of the computing systems (e.g., 105, 110, 115, 120) may be any suitable combination of hardware and/or software that enables the dynamic provision of debuggable program code. The computing systems may include one or more portions of one or more computer systems. In particular embodiments, one or more of these computer systems (alone or in combination with one or more other computer systems or other components) may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein.

The components of one or more computer systems may comprise any suitable physical form, configuration, number, type, and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed, span multiple locations, span multiple machines, or reside in a cloud, which may include one or more cloud components in one or more networks.

Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

In particular embodiments, a computer system may include a processor, memory, storage, a communication interface, and a display. As an example, computing device 105 comprises a computer system that includes one or more processors 202, memory 204, storage 206, communication interface 208, and display 210; computing device 110 comprises a computer system that includes one or more processors 212, memory 214, storage 222, communication interface 224, and display 226; application server 115 comprises a computer system that includes one or more processors 228, memory 232, storage 230, and communication interface 240; and database system 120 comprises a computer system that includes one or more processors 244, memory 246, storage 250, and communication interface 254. These components may work together in order to provide functionality described herein.

A processor 202, 212, 228, or 244 may be a microprocessor, controller, or any other suitable computing device, resource, or combination of hardware, stored software and/or encoded logic operable to provide, either alone or in conjunction with other components of the computing systems, computing system functionality. In some embodiments, the computing systems may utilize multiple processors to perform the functions described herein.

Memory 204, 214, 232, or 246 and/or storage 206, 222, 230, or 250 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 204, 214, 232, or 246 and/or storage 206, 222, 230, or 250 may store any suitable data or information utilized by a computing system, including software embedded in a computer readable medium, and/or encoded logic incorporated in hardware or otherwise stored (e.g., firmware). In some embodiments, memory 204, 214, 232, or 246 and/or storage 206, 222, 230, or 250 may store one or more applications 216 or 234, instrumentation agents 218 or 236, debuggers 220 and 238, decompilers 219 and 239, or compilers 221 and 241. Memory 204, 214, 232, or 246 and/or storage 206, 222, 230, or 250 may also store the results and/or intermediate results of the various calculations and determinations performed by processor 202, 212, 228, or 244.

In particular embodiments, the operations of the embodiments may be performed by one or more computer readable media encoded with a computer program, software, computer executable instructions, and/or instructions capable of being executed by a computing system. In particular embodiments, the operations of the embodiments may be performed by one or more computer readable media storing, embodied with, and/or encoded with a computer program and/or having a stored and/or an encoded computer program.

Communication interface 208, 224, 240, or 254 may be used for the communication of signaling and/or data between a computing system and one or more networks (e.g., network 130) and/or components coupled to a network. Display 210 or 226 may be used to facilitate interaction between a computing system and one or more users. Display 210 or 226 may comprise any device or combination of devices capable of providing a visual representation of data of a computing system. As an example, display 210 or 226 may be a computer monitor or other screen.

One or more of the computing systems may include a compiler (e.g., 221 or 241). A compiler may comprise one or more computer programs that transforms source code written in a high-level programming language (the source language) into another lower level computer language (the target language). The lower level computer language may comprise any suitable form, such as bytecode, object code, assembly language, machine code, or other form. A compiler may perform any suitable operations, such as lexical analysis, preprocessing, parsing, semantic analysis (syntax-directed translation), code generation, or code optimization. A compiler may have the ability to preserve in the compiled code information associated with the source code, such as line numbers of the source code or variable names of the source code. In some embodiments, one or more compiler options may be set at the time of compilation in order to preserve such information.

One or more of the computing systems may include a decompiler (e.g., 219 or 239). A decompiler may comprise one or more computer programs that performs the reverse operation to that of a compiler. That is, the decompiler translates program code at a relatively low level of abstraction (usually designed to be computer readable rather than human readable) into a form having a higher level of abstraction (usually designed to be human readable). A decompiler usually does not perfectly reconstruct the original source code but may generate human readable source code that is functionally equivalent with the original source code.

Figure 2:
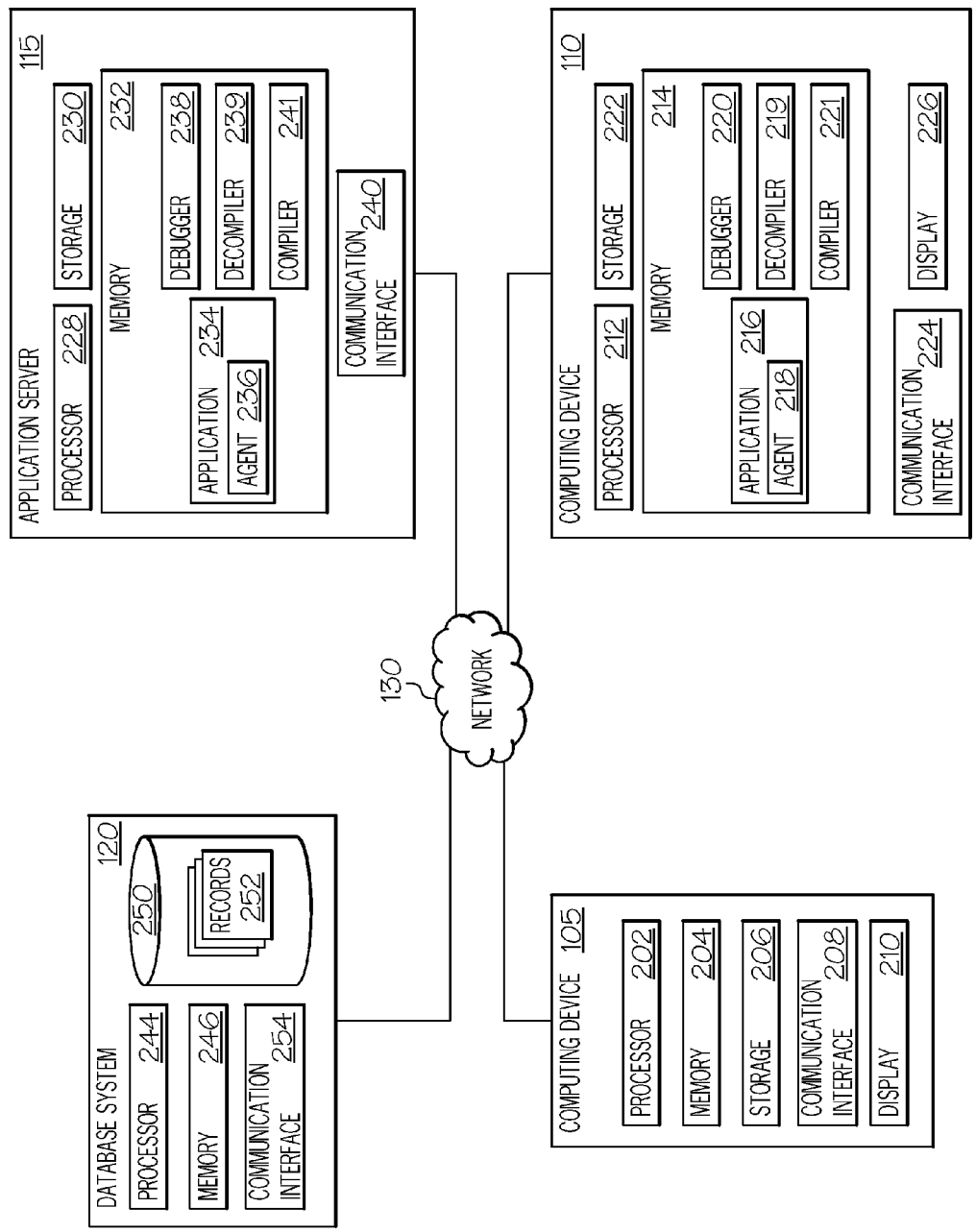
FIG. 2 illustrates a block diagram illustrating components of the computing systems of FIG. 1 in accordance with certain embodiments.

One or more of the computing systems may host one or more services, database management systems, programs, or applications (referred to collectively in the example associated with FIG. 2 as "applications" (e.g., 216, 234)). In some embodiments, one or more applications may be associated with an instrumentation agent (e.g., 218, 236). In particular embodiments, an instrumentation agent (e.g., 218 or 236) may attach to or otherwise be associated with an application (e.g., 216 or 234) that processes code during runtime (e.g., at a time when a program associated with the code is being executed or the execution of the program is being initiated). That is, application 234 may process code associated with another application or program. In one embodiment, application 216 or 234 is a run-time interpreter or virtual machine (e.g., a JVM or Common Language Runtime (CLR)) that processes code (e.g., bytecode) that is derived from (e.g., compiled from) source code of a different application and outputs code (e.g., machine code) adapted to the specific hardware (e.g., processor 212 or 228) on which the code will be executed. The instrumentation agent may be able to observe the behavior of and interact with its associated application. For example, while the associated application is running, the instrumentation agent may be able to inspect commands sent to the application or generated within the application. The instrumentation agent may be able to modify the normal operation of the application. For example, the instrumentation agent may be able to temporarily suspend operation of the application or change an input parameter to a request associated with (e.g., received by or sent from) the application. In particular embodiments, the instrumentation agent may communicate with other components of system 200 (e.g., decompiler 219 or 239 or compiler 221 or 241) to issue commands and receive results. Various embodiments of an instrumentation agent will be described in greater detail in connection with FIG. 4.

One or more of the computing systems may execute a debugger (e.g., 220 or 238). A debugger is any suitable application that facilitates locating and/or fixing errors within program code. As an example, if the proper information is available in the lower-level code that is executed, a debugger may identify the line or expression in the source code that resulted in a particular instruction (e.g., a machine code instruction) of a running program loaded in memory and/or the names and values of local variables from the source code. This enables a user to analyze a program's behavior in high-level terms, such as source-level flow control constructs, procedure calls, named local variables, or the like instead of machine instructions and memory locations. A debugger may also allow a user to step through source code execution one line at a time and set breakpoints in the source code.

In particular embodiments, a debugger may be associated with an application that is executed by a computing system. For example, the debugger may facilitate debugging of the code of the application. In one example, debugger 220 or 238 may be associated with an application that is executed using code produced by application 216 or 234 (e.g., if application 216 or 234 is a virtual machine). In some embodiments, a debugger may initiate the execution of a particular application. In other embodiments, a debugger may launch upon an event encountered within the application (such as a thrown exception). If the proper information is available, source code associated with the instruction(s) that threw the error may be displayed by the debugger along with the state of local variables and lines numbers of the source code.

As described earlier, a code module of an application may have been compiled in a manner that strips the compiled code of information that is important for debugging purposes (e.g., one or more of line numbers of the source code, local variable names, etc.). Unless a copy of the source code is kept (or available), after compilation, the source code and/or source code information (e.g., line numbers, variable names) are lost. Debugger tools can be reliant upon the source code and source code information in order to perform debugging of a particular program. As a result, when the original source code is unavailable (such as in products obtained from third party partners or open source libraries), some or all of the debugger features mentioned above may not be available and an entity can be limited in their ability to test, troubleshoot, and develop new software based on these programs.

As will be described in further detail below, various embodiments may provide systems and methods for decompiling such code at runtime to produce new source code, compiling the new source code in a manner that preserves information associated with the new source code, and executing the new compiled code in place of the original compiled code. Such embodiments allow a debugger to restore various debugging features (such as those listed above) with respect to the new compiled code that would not have been available with respect to the original compiled code.

Figure 3:
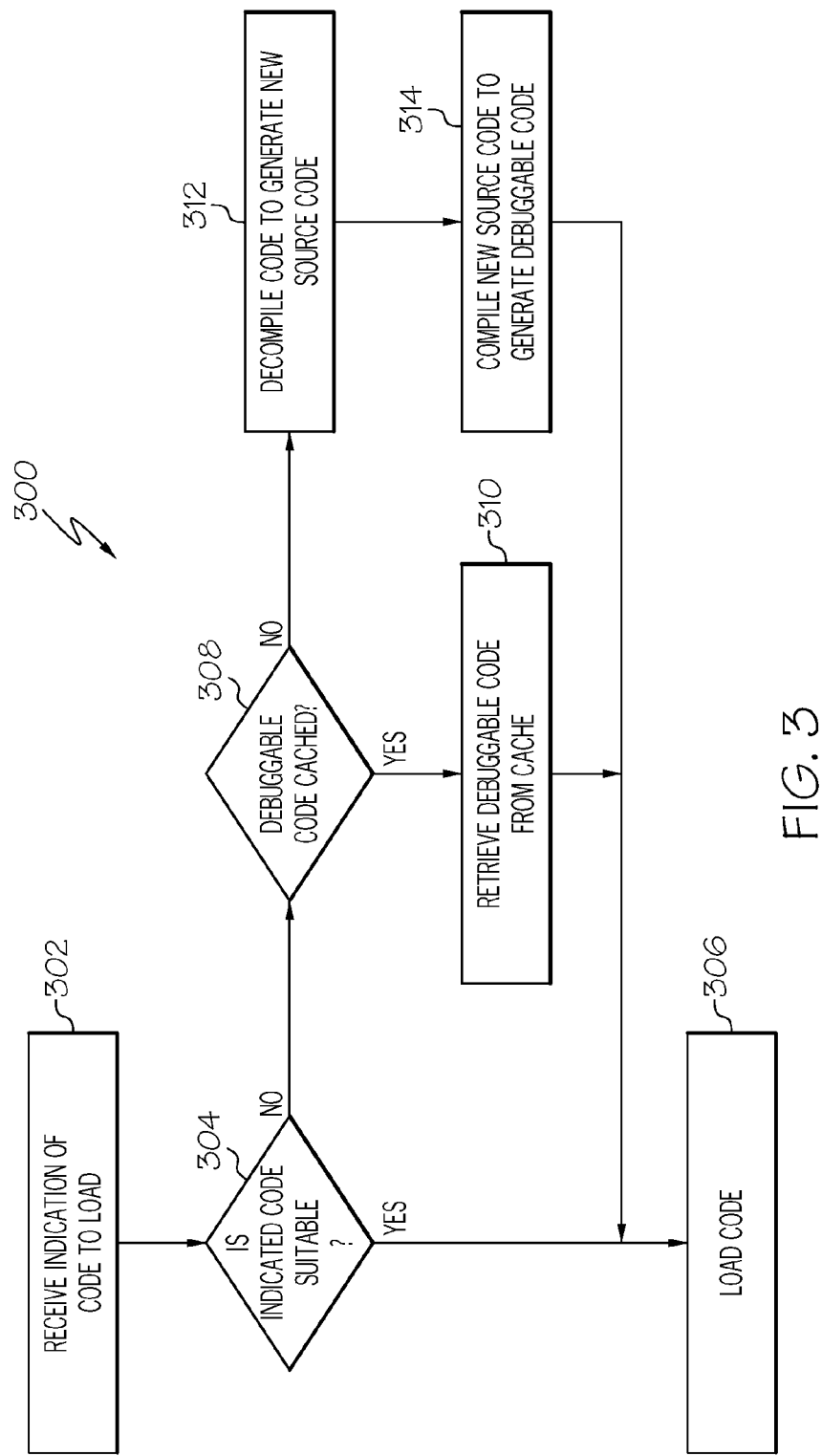
FIG. 3 illustrates an example method for dynamically providing debuggable program code in accordance with certain embodiments.

FIG. 3 illustrates an example method for dynamically providing debuggable program code at runtime in accordance with certain embodiments. The steps of the flow may be performed by any suitable computing system, alone or in combination with one or more other computing systems. As an example, each step may be performed at a single computing system, such as computing device 110 or application server 115. As another example, the steps may be performed collectively among multiple computing systems, such as computing device 105, application server 115, and/or database system 120. In particular embodiments, an application (e.g., 216 or 234) or instrumentation agent (e.g., 216 or 236) performs or initiates each of the steps described below. In some embodiments, the steps may be performed on a per-class (or other similar code unit) basis.

The method begins at step 302, where an indication of code to load is received. The indication may be received in conjunction with a request to execute the code. As an example, the code may be loaded from storage and optionally processed (e.g., by a virtual machine) before being executed by a processor. The indication may refer to compiled program code. For example, the code may comprise code written in an intermediate program language such as bytecode (e.g., Java bytecode) or other suitable type of program code. In various embodiments, the code may be in a format that is at a lower level of abstraction than the source code used to generate the compiled code.

In a particular embodiment, the indication may be sent in response to the starting of a program. The program may include several different modules (e.g., classes) of program code that need to be loaded and executed (as needed) in order to function. Accordingly, for a particular program, one or more steps of method illustrated in FIG. 3 may be performed for each module of program code in the program that is loaded during execution of the program.

The indication may be received by any suitable entity. In a particular embodiment, the code is received by an application (e.g., 216 or 234) that comprises or is otherwise associated with an instrumentation agent (e.g., 218 or 236). The application or agent may detect the reception of the indication of the code and perform one or more actions in response to the detection as described in further detail below. In a particular embodiment, the application that receives the indication of the code to execute is a virtual machine and the indication refers to a class (e.g., of bytecode) to be loaded by the virtual machine prior to execution.

At step 304, it is determined whether the indicated code should be loaded (e.g., from storage). Decompiling and recompiling code incurs a latency penalty, thus it may not be desirable to decompile and recompile all of the code of the program. Any suitable factors may be considered in determining whether the indicated code should be loaded. For example, if the code is from a trusted source and is unlikely to include errors, it may be determined that the code should be loaded. As another example, if the code already includes information useful for debugging (e.g., one or more of code lines and variable names) the code may be loaded without decompiling and recompiling.

In particular embodiments, one or more filters may be utilized to determine whether the indicated code is suitable to execute. A filter may include indications identifying code that should not be loaded or indications identifying code that should be loaded. Such a filter may include one or more keywords that may be compared against the code to determine whether it matches the filter. For example, a keyword may be compared against a name of a class to determine whether it matches the filter. As another example, a particular package may be specified and any classes in that package will be determined to match the filter. In other embodiments, a filter may specify any suitable characteristics of code.

If it is determined that the code should be loaded, then at step 306, the indicated code is retrieved (e.g., from storage) and loaded. If it is determined at step 304 that the code should not be loaded, at step 308 it is determined whether one or more caches include debuggable code corresponding to the code indicated at step 302. For example, the debuggable code may have been generated (through decompiling and recompiling) previously when corresponding code was attempted to be loaded and stored for future use. The corresponding debuggable code may be identified in any suitable manner. For example, a hash of the indicated code may be calculated and associated with the debuggable code in storage. Accordingly, when an attempt to load the same code is made, the hash of the indicated code may be compared against hashes associated with stored debuggable code to determine whether the corresponding debuggable code is already available. As another example, a timestamp associated with the code may be examined to determine whether code is the same as previously encountered code.

If debuggable code already exists, it is retrieved from the cache at step 310 and then loaded (e.g., from storage) at step 306. If the debuggable code is not located, the indicated code is decompiled at step 312 to generate new source code. The new source code will likely not be identical to the original source code, but will be functionally equivalent. At step 314, the new source code is compiled to generate debuggable code. The debuggable code is to include information associated with the new source code, such as line numbers, variable names, or other suitable information. The generated debuggable code may be cached for future use. In some embodiments, the new source code may also be cached for future use (e.g., by a debugger). At step 306, the debuggable code is loaded.

After the necessary code is loaded, the code may be executed to run the program. In various embodiments, execution may include translating the code into machine code adapted to a particular architecture and processing the machine code by a processor. In particular embodiments, the launching of the program that initiates the loading of the code may be performed by a debugger. This may allow a user to set breakpoints and/or step through the code in the debugger utilizing the debuggable code. In other embodiments, it may be performed by any other suitable entity.

In some embodiments, the debugger may be launched in response to an error thrown by the code as it executes. The debugger may access the debuggable code and the information associated with the source code to present information associated with the error to a user.

In other embodiments, the decompiling and recompiling operations may be done in response to an exception being thrown. Alternatively, an option to decompile and recompile may be presented to a user in response to an exception being thrown. In such instances, a stack trace indicating the path through the methods and line numbers that led to the exception may be presented to the user through the debugger.

In some instances, a class (or other similar program module) may be presented for loading that depends on another class that hasn't been loaded yet. In such instances, rather than having the application (e.g., virtual machine) load the class that is depended on, the decompiler may be notified to use the dependent class in order to correctly decompile the class.

Figure 4:
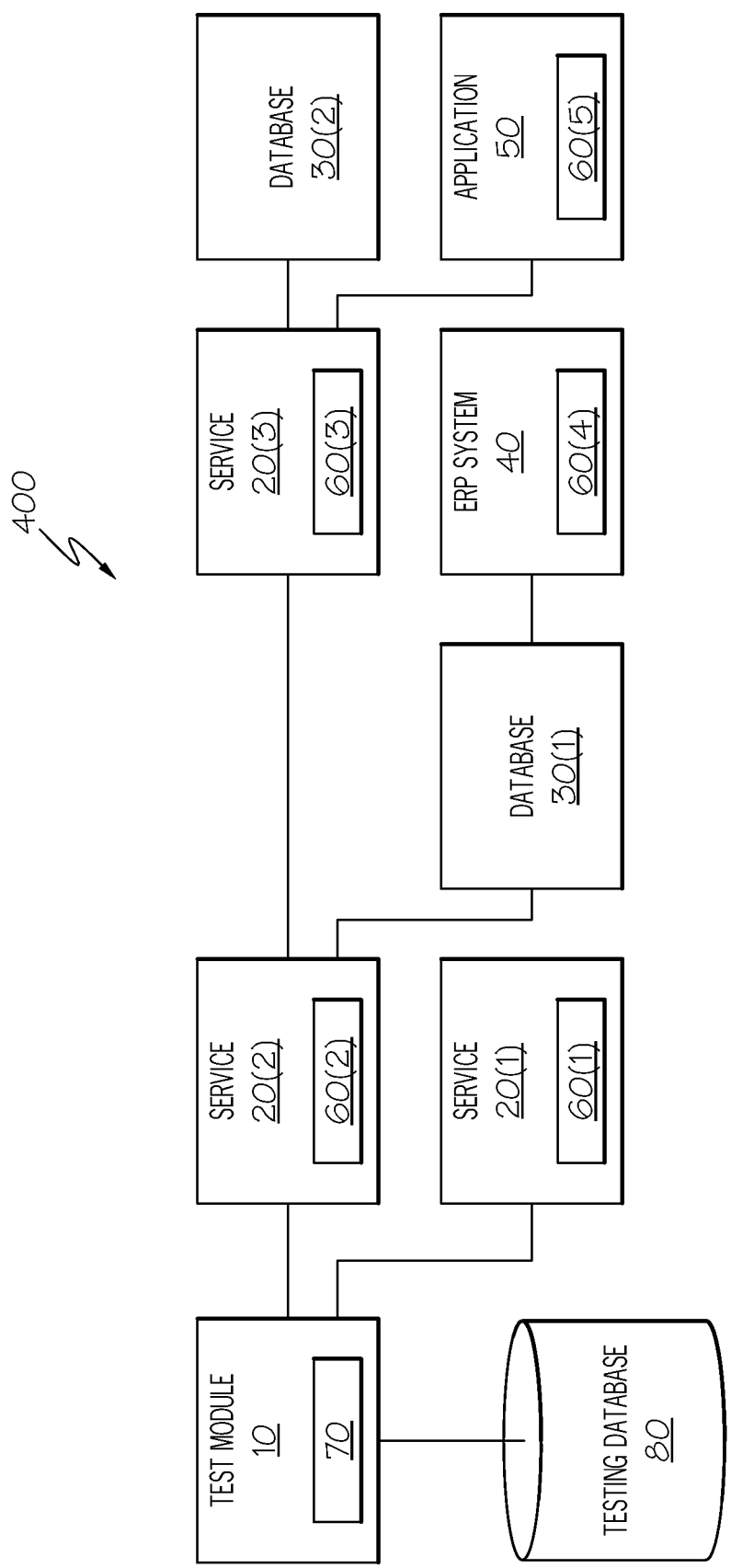
FIG. 4 illustrates an example system for software testing in accordance with certain embodiments.

FIG. 4 illustrates an example system 400 for software testing utilizing instrumentation agents in accordance with certain embodiments. As shown, the software architecture includes a test module 10, a plurality of services 20(1), 20(2), and 20(3), databases 30(1) and 30(2), an enterprise resource planning (ERP) system 40, and one or more applications 50. All or some of these components can be implemented in software that is executing on one or more computing systems (e.g., 105, 110, 115, 120, etc).

The components shown in FIG. 4 can all be implemented on the same computing system. However, in many embodiments, at least some of these components (or portions thereof) can be implemented on different computing systems, all or some of which can be coupled via one or more networks (e.g., a local area network, storage area network, and/or wide area network such as the Internet).

Each service 20(1)-20(3) can provide any of a variety of different services and can be implemented as any one or more of a variety of software components. For example, each service 20 can be a web service (e.g., having an interface defined by a web service definition language (WSDL) file), a web site (e.g., as implemented by one or more web pages provided by a web server), enterprise service, or the like. Services 20(1)-20(3) can each be implemented as an object or other component (e.g., an enterprise service bus (ESB) construct, an Enterprise JavaBean (EJB), a web component such as a JavaServer Pages (JSP) page or Java servlet component, other standalone Java component, or Java applet), as an application that includes any of the previously-mentioned components, or the like.

Databases 30(1) and 30(2) can each include a database server, database management system, and other utilities configured to assist in responding to requests to access information stored in a database. Application 50 can be any of a variety of different applications (e.g., a virtual machine) and can include any one or more of a variety of different software components.

Instrumentation agents 60(1)-60(5) (collectively referred to herein as instrumentation agents 60) can be software-implemented agents that are configured to provide visibility into the operations of each instrumented component to test module 10 or other entity. Each instrumentation agent 60 is configured to detect requests and responses being sent to and from the component in which that instrumentation agent is embedded. Each instrumentation agent 60 is configured to generate information about the detected requests and/or responses and to report that information to an instrumentation broker 70 that, in some instances, is coupled to, or otherwise associated with test module 10. Additionally, each instrumentation agent 60 can be configured to detect and report on activity that occurs internally to the component in which the instrumentation agent is embedded.

In response to detecting a request, response, and/or other activity to be monitored, each instrumentation agent 60 is configured to detect and/or modify one or more characteristics associated with that activity and/or the monitoring of that activity by the instrumentation agent. The characteristics can include a frame identifier, which identifies a message, with respect to the instrumentation agent, sent by the instrumentation agent to the instrumentation broker to report the characteristics; a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the instrumentation agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, EJB method invocations, EJB entity lifecycle events, heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like.

As the above examples indicate, characteristic information can include information generated by the instrumentation agent itself and information generated and/or processed by the component or sub-component monitored by the instrumentation agent. The instrumentation agent then causes information identifying those characteristics to be provided to an instrumentation broker 70 within (as shown) or coupled to test module 10. In some embodiments, each instrumentation agent collects information to form a message, also referred to herein as a frame, which describes characteristics associated with both a detected request and a detected response corresponding to that request. In such embodiments, the instrumentation agent can wait for the response corresponding to the request to be generated and sent before sending the frame to the instrumentation broker.

Instrumentation agents 60 can monitor activity (e.g., receipt of a request from test module 10 and any responses or related activity generated in response to such a request) initiated by test module 10, as well as activity generated in response to requests received from other components beside test module 10. Thus, instrumentation agents 60 can provide information about individual transactions that are not necessarily part of a test case.

Some instrumentation agents 60 can be implemented by inserting a few lines of code into the software component (or the application server associated with that software component) being instrumented. Some components (or their corresponding application servers) may not provide users with the ability to modify their code, and thus some instrumentation agents can be implemented externally to the component being monitored in a manner that can cause all requests and responses being sent to and/or from that component to be handled by the instrumentation agents. For example, for an existing database, an instrumentation agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver.

In some embodiments, all or some of instrumentation agents 60 are configured to perform interception, inspection, and/or modification (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the instrumentation agent to detect requests and responses, as well as the characteristics of those responses. In particular, this functionality can allow an instrumentation agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written.

As requests and responses progress through the test system, additional characteristic information is captured and sent to the instrumentation broker 70 by the instrumentation agents 60. For example, when test module 10 sends a request to service 20(2), instrumentation agent 60(2) can capture characteristic information associated with that request (e.g., the time at which the request was received, the sender of that request, the time at which corresponding requests were sent to database 30(1) and/or service 20(3), how much data was exchanged, the identity of the communication channel used in the request or response, and the like) and the corresponding response, and then send that characteristic information to instrumentation broker 70. Instrumentation agents 60 can send information to instrumentation broker 70 independently of each other, as well as independently of the progress of the test case.

Once the information is organized and stored in testing database 80, test module 10 can extract that information, process the extracted information, display that information (or graphics or text representing that information) to a user, and/or allow a user to manipulate a test case based upon that information. For example, the test module can use the information in testing database 80 to identify which components were involved in the execution of the test case; in order to identify response times for certain system components, based upon the differences in request and response times; and the like, and to display that information to a user.

Test module 10 can display the processed information to a user in a display window. The displayed information can identify each component or sub-component that was involved in the test case (e.g., each of the components shown in FIG. 4). The user can then manipulate the displayed information in order to see details of the testing process and/or modify a test case.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
receiving a command to load first compiled program code for execution by a processor;
determining, based on a determination that line numbers or local variable names associated with source code of the first compiled program code are unavailable and a determination that a cache does not include compiled program code that is functionally equivalent to the first compiled program code, to decompile the first compiled program code instead of execute the first compiled program code in response to the received command to load the first compiled program code for execution;
decompiling the first compiled program code to generate source code in response to determining to decompile the first compiled program code instead of execute the first compiled program code;
compiling the source code to generate second compiled program code, the second compiled program code comprising information associated with the source code;
in response to receiving the command to load the first compiled program code for execution by the processor, loading the second compiled program code for execution by the processor; and
providing the second compiled program code to a debugger.

2. The method of claim 1, further comprising storing the second compiled program code in a cache.

3. The method of claim 2, further comprising associating the stored second compiled program code with a hash calculated from at least a portion of the first compiled program code.

4. The method of claim 2, further comprising associating the stored second compiled program code with a timestamp associated with the first compiled program code.

5. The method of claim 2, further comprising:
receiving a second request to load the first compiled program code for execution by the processor;
retrieving the second compiled program code from the cache; and
loading the second compiled program code in the place of the first compiled program code.

6. The method of claim 1, wherein the decompiling the first compiled program code is performed further in response to a determination that a cache does not comprise source code associated with the first compiled code.

7. The method of claim 1, wherein the second compiled program code comprises at least one of variable names of source code or line numbers of source code.

8. The method of claim 1, wherein the determining to decompile the first compiled program code instead of execute the first compiled program code is further based on a determination that the first compiled program code is not from a trusted source.

9. The method of claim 1, wherein the determining to decompile the first compiled program code instead of execute the first compiled program code is further based on a determination of whether the first compiled program code matches a filter.

10. The method of claim 9, wherein the filter specifies a package and any classes in that package match the filter.

11. A computer program product comprising a non-transitory computer readable storage medium comprising computer readable program code embodied therewith, the computer readable program code comprising:
computer readable program code configured to receive a command to load first compiled program code for execution by a processor;
computer readable program code configured to determine, based on a determination that line numbers or local variable names associated with source code of the first compiled program code are unavailable and a determination that a cache does not include compiled program code that is functionally equivalent to the first compiled program code, to decompile the first compiled program code instead of execute the first compiled program code in response to the received command to load the first compiled program code for execution;

computer readable program code configured to decompile the first compiled program code to generate source code in response to the determination to decompile the first compiled program code instead of execute the first compiled program code;

computer readable program code configured to compile the source code to generate second compiled program code, the second compiled program code comprising information associated with the source code;

computer readable program code configured to load the second compiled program code for execution by the processor in response to the command to load the first compiled program code for execution by the processor; and computer readable program code configured to provide the second compiled program code to a debugger.

12. The computer program product of claim 11, the computer readable program code further comprising computer readable program code configured to store the second compiled program code in a cache.

13. The computer program product of claim 11, wherein the second compiled program code comprises variable names of the source code.

14. The computer program product of claim 11, wherein the second compiled program code comprises line numbers of the source code.

15. The computer program product of claim 12, wherein the computer readable program code configured to decompile the first compiled program code to generate source code is further configured to decompile the first compiled program code to generate source code in response to a determination that the cache does not include code associated with the first compiled program code.

16. The computer program product of claim 11, wherein the determining to decompile the first compiled program code instead of execute the first compiled program code is further based on a determination that the first compiled program code is not from a trusted source.

17. The computer program product of claim 11, wherein the determining to decompile the first compiled program code instead of execute the first compiled program code is further based on a determination of whether the first compiled program code matches a filter.

18. The computer program product of claim 16, wherein the filter specifies a package and any classes in that package match the filter.

19. A system comprising:
a data processing apparatus;
a memory element;
an instrumentation agent to:
receive a command to load first compiled program code for execution by a processor;
determine, based on a determination that line numbers or local variable names associated with source code of the first compiled program code are unavailable and a determination that a cache does not include compiled program code that is functionally equivalent to the first compiled program code, to decompile the first compiled program code instead of execute the first compiled program code in response to the received command to load the first compiled program code for execution;
initiate decompilation of the first compiled program code to generate source code in response to the determination to decompile the first compiled program code instead of execute the first compiled program code;
initiate compilation of the source code to generate second compiled program code, the second compiled program code comprising information associated with the source code;
in response to receiving the command to load the first compiled program code for execution by the processor, loading the second compiled program code for execution by the processor; and
provide the second compiled program code to a debugger.

20. The system of claim 19, the instrumentation agent further to store the second compiled program code in a cache.

21. The system of claim 19, wherein the second compiled program code comprises variable names of the source code.

22. The system of claim 19, wherein the second compiled program code comprises line numbers of the source code.

* * * * *